(12) United States Patent
Liu et al.

(10) Patent No.: US 10,725,551 B2
(45) Date of Patent: Jul. 28, 2020

(54) THREE-DIMENSIONAL TOUCH SENSING METHOD, THREE-DIMENSIONAL DISPLAY DEVICE AND WEARABLE DEVICE

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Chong Liu, Beijing (CN); Wei Wang, Beijing (CN); Haisheng Zhao, Beijing (CN); Xiaoguang Pei, Beijing (CN); Zhilong Peng, Beijing (CN); Huanping Liu, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 212 days.

(21) Appl. No.: 15/150,929

(22) Filed: May 10, 2016

(65) Prior Publication Data

US 2016/0378243 A1    Dec. 29, 2016

(30) Foreign Application Priority Data

Jun. 24, 2015    (CN) .......................... 2015 1 0355772

(51) Int. Cl.
*G06F 3/01* (2006.01)
*G06F 3/042* (2006.01)
*G06F 3/038* (2013.01)

(52) U.S. Cl.
CPC .............. *G06F 3/017* (2013.01); *G06F 3/014* (2013.01); *G06F 3/0386* (2013.01); *G06F 3/042* (2013.01); *G06F 2203/04101* (2013.01)

(58) Field of Classification Search
CPC .......... G06F 3/017; G06F 3/042; G06F 3/014; G06F 3/0386; G06F 2203/04101
See application file for complete search history.

(56) References Cited

U.S. PATENT DOCUMENTS

| | | | | |
|---|---|---|---|---|
| 4,869,253 A | * | 9/1989 | Craig, Jr. ........... | A61B 5/14551 340/573.1 |
| 5,321,353 A | * | 6/1994 | Furness ................. | B25J 9/1697 318/568.11 |
| 5,771,039 A | * | 6/1998 | Ditzik ..................... | G02B 6/08 257/E27.111 |
| 5,959,617 A | * | 9/1999 | Bird ..................... | G06F 3/03542 345/182 |

(Continued)

*Primary Examiner* — Grant Sitta

(57) ABSTRACT

Embodiments of the present disclosure relate to a three-dimensional touch sensing method, a three-dimensional display device and a wearable device. The three-dimensional touch sensing method, comprising: receiving an electron beam being perpendicularly incident to a preset plane on the preset plane, the electron beam having a preset emission intensity; obtaining a reception position and a reception intensity of the electron beam; determining a projection position of a touch position on the preset plane according to the reception position of the electron beam; and calculating a distance from the touch position to the preset plane according to the reception intensity of the electron beam and the preset emission intensity.

13 Claims, 5 Drawing Sheets

(56) References Cited

U.S. PATENT DOCUMENTS

| | | | | |
|---|---|---|---|---|
| 6,727,885 B1* | 4/2004 | Ishino | G06F 3/0325 | 345/156 |
| 7,859,523 B2* | 12/2010 | Kong | G06F 3/0346 | 345/158 |
| 8,754,847 B2* | 6/2014 | Huang | G06F 3/0386 | 345/156 |
| 8,913,003 B2* | 12/2014 | Grunnet-Jepsen | G06F 3/0421 | 345/156 |
| 9,256,089 B2* | 2/2016 | Emerton | G02F 1/13318 | |
| 2003/0179323 A1* | 9/2003 | Abileah | G02F 1/13338 | 349/24 |
| 2005/0200291 A1* | 9/2005 | Naugler, Jr. | G06F 3/0412 | 315/149 |
| 2005/0237313 A1* | 10/2005 | Yoshida | G06F 3/03545 | 345/183 |
| 2006/0007224 A1* | 1/2006 | Hayashi | G02F 1/1313 | 345/207 |
| 2006/0170658 A1* | 8/2006 | Nakamura | G06F 3/0412 | 345/173 |
| 2007/0182724 A1* | 8/2007 | Kirchner | G06F 3/0412 | 345/175 |
| 2009/0141008 A1* | 6/2009 | Johnson | G06F 3/041 | 345/179 |
| 2010/0019170 A1* | 1/2010 | Hart | A61B 1/043 | 250/459.1 |
| 2010/0036393 A1* | 2/2010 | Unsworth | G06F 3/0308 | 606/130 |
| 2010/0134531 A1* | 6/2010 | Kinugasa | G06F 1/3203 | 345/690 |
| 2011/0096021 A1* | 4/2011 | Kim | G02F 1/13338 | 345/174 |
| 2011/0148859 A1* | 6/2011 | Huang | G06F 3/0304 | 345/419 |
| 2011/0273390 A1* | 11/2011 | Nakatsuji | G06F 3/0412 | 345/173 |
| 2012/0086019 A1* | 4/2012 | Kaneko | G02F 1/13338 | 257/82 |
| 2012/0098745 A1* | 4/2012 | Wang | G03B 21/26 | 345/158 |
| 2012/0146953 A1* | 6/2012 | Yi | G06F 3/0412 | 345/175 |
| 2012/0212454 A1* | 8/2012 | Kiyose | G06F 3/0416 | 345/175 |
| 2012/0218390 A1* | 8/2012 | Wang | G06F 3/0304 | 348/51 |
| 2012/0229384 A1* | 9/2012 | Nakane | G06F 3/03545 | 345/158 |
| 2012/0241768 A1* | 9/2012 | Murai | G06F 3/0412 | 257/84 |
| 2013/0155057 A1* | 6/2013 | Wang | G06F 3/0386 | 345/419 |
| 2013/0169596 A1* | 7/2013 | Wang | G06F 3/0425 | 345/175 |
| 2013/0169643 A1* | 7/2013 | Suh | G01B 11/22 | 345/426 |
| 2013/0208953 A1* | 8/2013 | Yuan | G06K 9/00255 | 382/118 |
| 2015/0009149 A1* | 1/2015 | Gharib | G06F 3/005 | 345/168 |
| 2015/0324025 A1* | 11/2015 | Shin | G06F 3/041 | 345/173 |
| 2016/0061588 A1* | 3/2016 | Cho | H04M 1/7253 | 356/614 |
| 2016/0147308 A1* | 5/2016 | Gelman | G06F 3/01 | 345/156 |
| 2016/0219270 A1* | 7/2016 | Chen | G06F 3/0412 | |
| 2017/0115732 A1* | 4/2017 | Lian | G06F 3/013 | |

* cited by examiner

THREE-DIMENSIONAL TOUCH SENSING METHOD, THREE-DIMENSIONAL DISPLAY DEVICE AND WEARABLE DEVICE

TECHNICAL FIELD

Embodiments of the present disclosure relate to a three-dimensional touch sensing method, a three-dimensional display device and a wearable device.

BACKGROUND

As one technical hot spot at present, a touch technology has been widely used in a 2-Dimensional (2D) display device, and particularly, achieves a commercial success in application in an intelligent terminal device. However, for a 3-Dimensional (3D) display device which gradually rises in recent years, a traditional touch technology has demonstrated a considerable degree of limitation.

For example, a 3D game can provide a user with a vivid and lifelike brand new gaming experience; and if in a course of a game, the user also has to operate by touching a screen with his/her fingers, it will undoubtedly bring quite bad influence to user experience of the game. Thus, if game operation may be performed by directly touching a three-dimensional image instead of the screen, it is undoubtedly an excellent experience for the user.

Therefore, how to sense a touch of the user in a three-dimensional space has become a technical problem to be urgently solved in the present technical field.

SUMMARY

Embodiments of the present disclosure relate to a three-dimensional touch sensing method, a three-dimensional display device and a wearable device, which may implement sensing the touch action of the user in the three-dimensional space.

In one aspect, an embodiment of the present disclosure provides a three-dimensional touch sensing method, comprising: receiving an electron beam being perpendicularly incident to a preset plane on the preset plane, the electron beam having a preset emission intensity; obtaining a reception position and a reception intensity of the electron beam; determining a projection position of a touch position on the preset plane according to the reception position of the electron beam; and calculating a distance from the touch position to the preset plane according to the reception intensity of the electron beam and the preset emission intensity.

In another aspect, an embodiment of the present disclosure provides a three-dimensional display device, comprising: a preset plane, positioned at a preset position in a thickness direction; a plurality of receiving units, the receiving units being used for receiving an electron beam being perpendicularly incident to the preset plane on the preset plane, the electron beam having a preset emission intensity; an obtaining unit connected with the plurality of receiving units, the obtaining unit being used for obtaining an identifier of the receiving unit which receives the electron beam, and a reception intensity of the electron beam received by the receiving unit; a determining unit connected with the obtaining unit, the determining unit being used for determining a projection position of a touch position on the preset plane according to the identifier of the receiving unit obtained by the obtaining unit; a calculating unit connected with the obtaining unit, the calculating unit being used for calculating a distance from the touch position to the preset plane, according to the reception intensity of the electron beam obtained by the obtaining unit and the preset emission intensity.

In still another aspect, an embodiment of the present disclosure provides a three-dimensional touch sensing method, comprising: emitting an electron beam having a preset emission intensity to a preset plane at a preset position located in a thickness direction of the three-dimensional display device according to claim 7, so that the three-dimensional display device is configured to: receive the electron beam being perpendicularly incident to the preset plane; obtain a reception position and a reception intensity of the electron beam; determine a projection position of an emission position of the electron beam on the preset plane according to the reception position of the electron beam; calculate a distance from the emission position of the electron beam to the preset plane by a preset electron beam intensity attenuation relationship, according to the reception intensity of the electron beam and the preset emission intensity.

In still another aspect, an embodiment of the present disclosure provides a wearable device, comprising: an emitting unit, the emitting unit being used for emitting an electron beam having a preset emission intensity to a preset plane at a preset position located in a thickness direction of a three-dimensional display device, so that the three-dimensional display device is configured to: receive the electron beam perpendicularly incident into the preset plane; obtain a reception position and a reception intensity of the electron beam; determine a projection position of an emission position of the electron beam on the preset plane according to the reception position of the electron beam; and calculate a distance from the emission position of the electron beam to the preset plane by a preset electron beam intensity attenuation relationship, according to the reception intensity of the electron beam and the preset emission intensity.

BRIEF DESCRIPTION OF THE DRAWINGS

In order to clearly illustrate the technical solution of the embodiments of the invention, the drawings of the embodiments will be briefly described in the following; it is obvious that the described drawings are only related to some embodiments of the invention and thus are not limitative of the invention.

DETAILED DESCRIPTION

In order to make objects, technical details and advantages of the embodiments of the invention apparent, the technical solutions of the embodiment will be described in a clearly and fully understandable way in connection with the drawings related to the embodiments of the invention. It is obvious that the described embodiments are just a part but not all of the embodiments of the invention. Based on the described embodiments herein, those skilled in the art can obtain other embodiment(s), without any inventive work, which should be within the scope of the invention.

Figure 1:
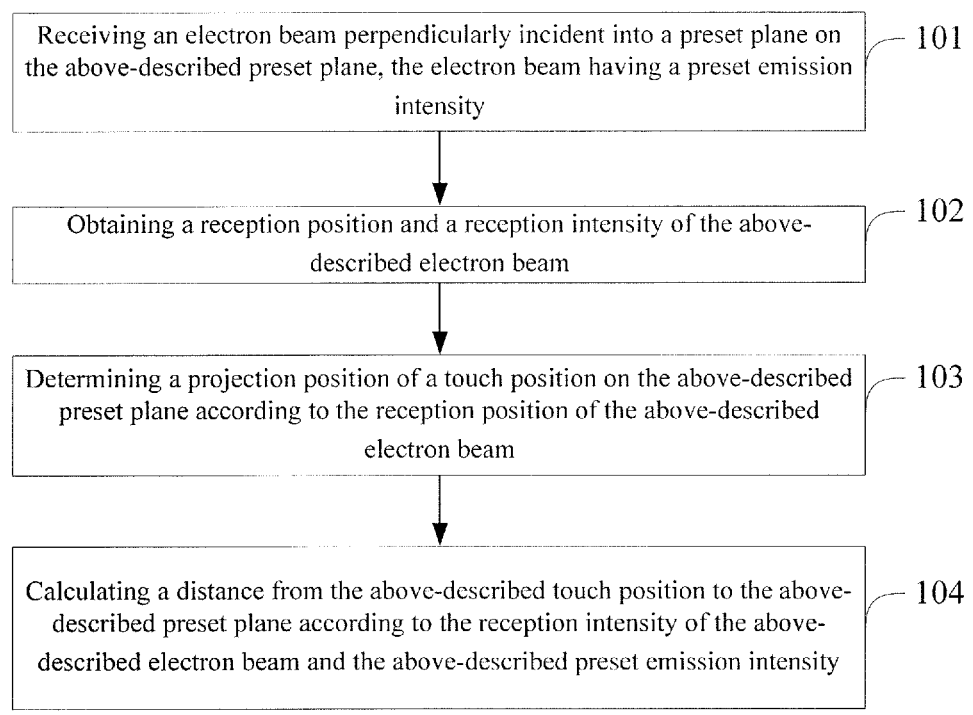
FIG. 1 is a flow schematic diagram of steps of a three-dimensional touch sensing method according to an embodiment of the present disclosure.

FIG. 1 is a flow schematic diagram of steps of a three-dimensional touch sensing method according to an embodiment of the present disclosure. With reference to FIG. 1, the method comprises:

Step 101: receiving an electron beam being perpendicularly incident to a preset plane on the preset plane, the electron beam having a preset emission intensity;

Step 102: obtaining a reception position and a reception intensity of the electron beam;

Step 103: determining a projection position of a touch position on the above-described preset plane according to the reception position of the above-described electron beam;

Step 104: calculating a distance from the above-described touch position to the above-described preset plane according to the reception intensity of the above-described electron beam and the above-described preset emission intensity.

Exemplarily, the calculating a distance from the above-described touch position to the above-described preset plane according to the reception intensity of the above-described electron beam and the above-described preset emission intensity, includes: calculating the distance from the touch position to the preset plane according to a preset electron beam intensity attenuation relationship, the reception intensity of the electron beam and the preset emission intensity.

Exemplarily, the electron beam is emitted by a wearable device at the touch position.

It should be noted that, the three-dimensional touch sensing herein mainly refers to sensing a position designated by a user when the user views a 3D image; since under normal circumstances, there is no entity displayed by the 3D image really existing at the position designated by the user, "touch" here should be understood in a broad sense. It can be appreciated that, for sensing the position designated by the user, it is necessary to give a position where a sensing side is located in space, and thus, in an embodiment of the present disclosure, a "preset plane" is used as a reference object, so that the position designated by the user may be expressed as coordinates of the position with respect to the preset plane.

In an embodiment of the present disclosure, the above-described wearable device may have a shape of gloves, finger cots, or a ring and the like, and may emit the electron beam having the preset emission intensity, its emission direction may be designed to be the same as a direction pointed by a finger, so that when the user is equipped with the wearable device, the electron beam having the preset emission intensity may be emitted along a direction pointed by the finger. Correspondingly, in the above-described step 101, in order to receive the electron beam from the wearable device and being perpendicularly incident to the above-described preset plane on the preset plane, the electron beam that is not perpendicularly incident to the preset plane may be blocked (absorbed and/or reflected). However, in other embodiments of the present disclosure, it may also be designed that the emission direction of the electron beam and the preset plane are perpendicular to each other. For example, in the above-described wearable device, the emission direction of the electron beam may also be designed as a horizontal direction, and when the sensing is performed, it is ensured that the above-described preset plane is vertical, so that in the above-described step 101, the electron beam from the wearable device and being perpendicularly incident to the above-described preset plane may be received. It should be noted that, in an actual application scenario, it is almost impossible to achieve an absolute perpendicular effect, and thus, "perpendicular" referred to herein should be understood as "approximately perpendicular" with a predetermined tolerance limit.

After the above-described step 101, in an embodiment of the present disclosure, by step 102 to step 104 as described above, an emission position of the electron beam may be determined according to a reception situation of the electron beam, and then a position where the wearable device is located and the position designated by the user, that is, the touch position, can be determined.

In the above-described step 102, detection of an intensity of the electron beam may be implemented by any one or more of various types of sensors or detectors, and a position where a maximum intensity of the electron beam detected is positioned in the above-described preset plane may be determined as the reception position of the electron beam. Thus, the intensity of the electron beam within a predetermined range with the reception position of the electron beam as a center may be accumulated, to obtain the reception intensity of the electron beam. It should be understood that, distribution of detection points on the above-described preset plane and the above-described predetermined range may both be set according to a specific application scenario, which will not be repeated here.

In the above-described step 103, since an incidence direction of the received electron beam is perpendicular to the preset plane, the reception position of the electron beam on the preset plane is just a projection position of an emission position of the electron beam on the preset plane. With respect to the wearable device, the emission position of the electron beam and the position designated by the user, that is, the touch position, may both be predetermined in advance, and thus, the projection position of the above-described wearable device on the above-described preset plane, and the projection position of the position designated by the user, for example, the touch position on the above-described preset plane may be determined according to the reception position of the above-described electron beam.

Exemplarily, the preset electron beam intensity attenuation relationship is mainly based on an intensity attenuation formula before and after the electron beam perpendicularly passes through a layered medium:

$$I = I_0 e^{-md}$$

Where $I_0$ is an intensity value before the electron beam passes through the layered medium; I is an intensity value after the electron beam passes through the layered medium; e=2.718281828459 . . . is the base of natural logarithm; d is a thickness of the layered medium; and m is an attenuation coefficient, which is related to material which forms the layered medium. Accordingly, the reception intensity of the electron beam obtained in step 102 may be used as I in the formula, the above-described preset emission intensity may be used as $I_0$ in the formula, and the attenuation coefficient m is just an attenuation coefficient corresponding to air, and thus, a thickness of an air medium layer through which the electron beam passes may be obtained by calculation. Since the incidence direction of the received electron beam and the preset plane are perpendicular to each other, and with respect to the wearable device, the emission position of the electron beam and the position designated by the user may be both determined in advance, a distance from the above-described wearable device to the above-described preset plane and a distance from the position designated by the user to the above-described preset plane may be obtained thereby. Of course, if the electron beam, from emission to reception, also passes through other non-air medium layer in addition to air, then, according to material of the non-air medium layer and thicknesses thereof, an attenuation ratio A of the non-air medium layer to the electron beam may be calculated according to the formula above, and then the thickness of the air medium layer through which the electron beam passes is calculated by a formula below:

$$I=AI_0e^{-md}$$

Of course, the distance from the emission position of the electron beam to the preset plane is equal to a sum of the thickness of the air medium layer and the thicknesses of the non-air medium layer (of course, the thickness of the non-air medium layer may also be ignored when it is sufficiently small). Further, in order to enhance accuracy of calculating the distance from the position designated by the user to the preset plane, the attenuation coefficient in in the above-described preset electron beam intensity attenuation relationship may be obtained by an actual test performed in advance.

Finally, after the projection position of the position designated by the user on the preset plane, and the distance from the position designated by the user to the preset plane are determined, coordinates of the above-described position designated by the user with respect to the preset plane, for example, coordinates of the touch position with respect to the preset plane, may be uniquely determined.

It can be seen that, in an embodiment of the present disclosure, three-dimensional coordinates of the emission position of the electron beam may be obtained according to the electron beam received by the preset plane in a perpendicular direction, so as to obtain the position where the wearable device is located. When the user wears the wearable device on the finger, a touch of the user in a three-dimensional space may be sensed. Based on this, an embodiment of the present disclosure may be used for implementing touch operation without touching the screen with the finger, which facilitates implementing a vivid and lifelike 3D effect, to enhance user experience.

Figure 2:
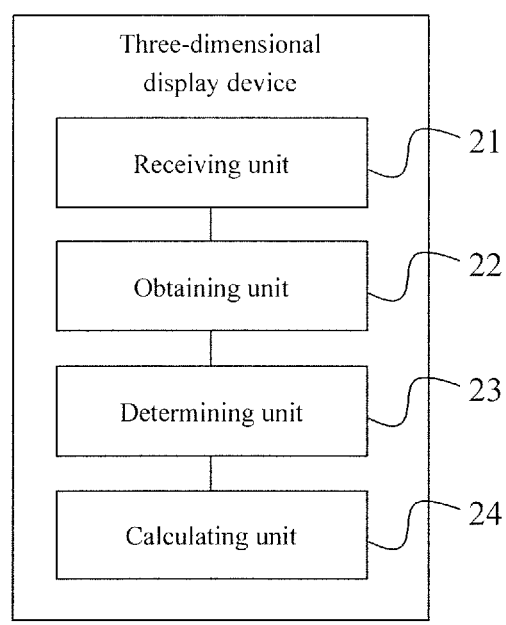
FIG. 2 is a structural block diagram of a three-dimensional display device according to an embodiment of the present disclosure.

FIG. 2 is a structural block diagram of a three-dimensional display device according to an embodiment of the present disclosure; and the three-dimensional display device according to the embodiment of the present disclosure is provided with a preset plane at a preset position in a thickness direction. With reference to FIG. 2, the device comprises:

a plurality of receiving units 21 (wherein only one is shown schematically in the diagram) located in the above-described preset plane, the above-described receiving unit 21 being used for receiving an electron beam emitted by a wearable device at the touch position and being perpendicularly incident to the above-described preset plane on the preset plane, the above-described electron beam having a preset emission intensity;

An obtaining unit 22 connected with the above-described plurality of receiving units 21, the above-described obtaining unit 22 being used for obtaining an identifier of the receiving unit 21 which receives the above-described electron beam, and a reception intensity of the above-described electron beam from the above-described receiving unit 21;

A determining unit 23 connected with the above-described obtaining unit 22, the above-described determining unit 23 being used for determining a projection position of the above-described touch position on the above-described preset plane according to the identifier of the receiving unit 21 obtained by the above-described obtaining unit 22;

A calculating unit 24 connected with the above-described obtaining unit 22, the above-described calculating unit 24 being used for calculating a distance from the above-described touch position to the above-described preset plane according to a preset electron beam intensity attenuation relationship, the reception intensity of the electron beam obtained by the above-described obtaining unit 22 and the above-described preset emission intensity.

It should be noted that, the three-dimensional display device according to the embodiment of the present disclosure may emit visible light from a surface of a certain size, so that emitted light enters human eyes, to form a three-dimensional image. It can be understood that, a thickness direction of the three-dimensional display device according to the embodiment of the present disclosure is just a direction perpendicular to the above-described surface of a certain size.

It should also be noted that, the display device of the embodiment of the present disclosure may be: any product or component having a display function, such as a display panel, electronic paper, a mobile phone, a tablet computer, a television, a laptop computer, a digital photo frame, a navigator, etc.

It can be seen that, the above-described plurality of receiving units 21, the above-described obtaining unit 22, the above-described determining unit 23 and the above-described calculating unit 24 may respectively execute step 101 to step 104 as shown in FIG. 1, and thus may have a structure and a function corresponding thereto, which will not be repeated here. Based on this, the three-dimensional display device according to the embodiment of the present disclosure may sense the position of the wearable device in the three-dimensional space, and thus may implement three-dimensional touch in combination with a displayed three-dimensional image.

As an example, the above-described receiving units 21 may specifically include: a plurality of sensing electrodes 21a located in the above-described preset plane, and a common electrode layer 21b (not shown) having a preset distance from the above-described preset plane. Therein, the above-described receiving units correspond to the above-described sensing electrodes in a one-to-one correspondence relationship. Thereby, the above-described sensing electrode 21a and the above-described common electrode layer 21b constitute two electrodes of a capacitor for receiving the above-described electron beam emitted by the wearable device and being perpendicularly incident to the above-described preset plane. Based on this, the sensing electrode 21a in the above-described receiving unit 21 may capture an electron arriving at the sensing electrode 21a, so as to receive the electron beam. Furthermore, the capacitor formed between the sensing electrode 21a and the common electrode layer 21b may store charge, so that the intensity of the electron beam may be obtained according to an amount of charges on each sensing electrode 21a. Of course, in order to avoid the common electrode layer 21b from blocking the electron beam, the common electrode layer 21b should be away from a surface emitting light of the above-described three-dimensional display device further than the preset plane in an incident direction of the electron beam.

Figure 3:
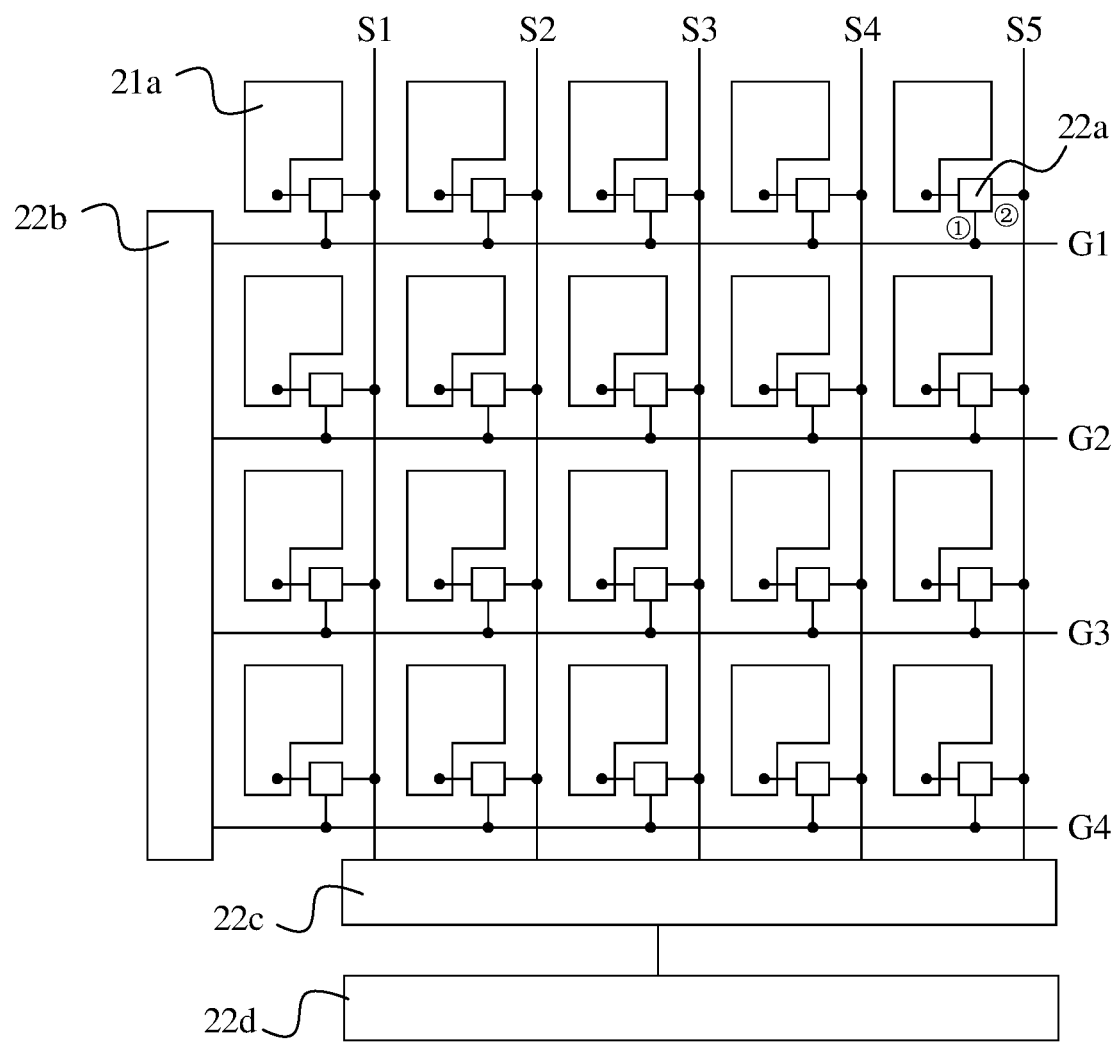
FIG. 3 is structural diagram of a partial circuit of a three-dimensional display device according to an embodiment of the present disclosure.

Further, FIG. 3 is a structural diagram of a partial circuit of a three-dimensional display device according to an embodiment of the present disclosure. With reference to FIG. 3, the above-described sensing electrodes 21a are arranged in a plurality of rows and a plurality of columns on the above-described preset plane (schematically shown as 4 rows and 5 columns in the diagram), and the above-described obtaining unit 22 according to the embodiment of the present disclosure may include:

A plurality of switching modules 22a respectively connected with the above-described sensing electrodes 21a in a one-to-one correspondence relationship, the above-described switching modules 22a being used for conducting electrical connection between the above-described sensing electrode and a second terminal (a terminal shown by "②" in the diagram) when a signal of a first terminal (a terminal shown by "①" in the diagram) is a first level. Of course, an internal structure of each of the switching modules in the diagram may be completely the same, and fabricated and formed by a same process at the same time.

An outputting module 22b connected with a plurality rows of scanning lines (four rows of scanning lines shown by G1, G2, G3 and G4 in the diagram), any row of the above-described scanning lines being also connected with the first terminal of the switching module 22a connected with one row of the above-described sensing electrodes 21a; the above-described outputting module 22b being used for sequentially outputting a scanning signal of the first level to the above-described plurality rows of scanning lines within each frame. For example, the outputting module 22b may sequentially output a single pulse signal with a waveform as a signal working at the first level to G1, G2, G3 and G4 within one frame (rising edges of pulses on G1, G2, G3 and G4 lag sequentially).

An exporting module 22c connected with a plurality columns of sensing lines (five columns of sensing lines shown by S1, S2, S3, S4 and S5 in the diagram), any column of the above-described sensing lines being also connected with the second terminals of the switching modules 22a connected with one column of the above-described sensing electrodes 21a; the above-described exporting module 22c being used for sequentially exporting charge on each row of sensing electrodes 21a within each frame, so as to obtain a total amount of charge received by each of the above-described sensing electrodes 21a within a previous frame. It can be understood that, the switching module 22a may conduct the above-described sensing electrode 21a and the second terminal when the signal received by the first terminal is the first level, and thus, with outputting of scanning signals G1 to G5, each row of switching modules 22a are turned on sequentially, and the sensing electrode 21a and a signal line connected with the second terminal are conducted, so that the exporting module 22c may export the charge on each sensing electrode 21a row by row. It should also be understood that, during a period from a time when the exporting module 22c exports charge on the sensing electrode 21a within one frame to a time when the exporting module 22c exports the charge on the sensing electrode 21a within a next frame, the sensing electrode 21a may accumulate charge by capturing the electron, which is finally exported by the exporting module 22c, and thus, the amount of charges exported by the exporting module 22c within each frame may be viewed as a total amount of charges received by the sensing electrode 21a within the previous frame.

An obtaining module 22d connected with the above-described exporting module 22c, the above-described obtaining module 22d being used for obtaining the identifier of the receiving unit 21 which receives the above-described electron beam, and the reception intensity of the above-described electron beam from the above-described receiving unit 21, according to the total amount of charge received by each of the above-described sensing electrodes 21a obtained by the above-described exporting module 22c. For example, if a total amount of charge received by the sensing electrode 21a only at a second row and a third column in the diagram within one frame is greater than a preset threshold, then, it may be determined that the reception position of the electron beam is just a position of the sensing electrode 21a on the preset plane, and thus, the reception position may be obtained just by obtaining the identifier of the receiving unit 21; on the other hand, since the reception position of the electron beam has been determined, the total amount of charges received by all the sensing electrodes 21a at the reception position and positions nearby may be added to obtain the reception intensity of the electron beam.

It can be seen that, in an embodiment of the present disclosure, the charge accumulated on the sensing electrode within the previous frame may be read by scanning in each frame, so as to obtain the reception position and the reception intensity of the electron beam.

Figure 4A:
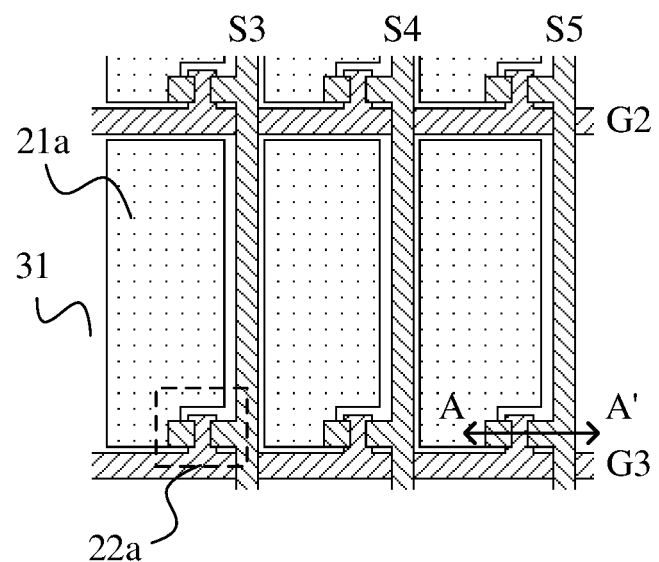
FIG. 4A is a top-view structural schematic diagram of a three-dimensional display device near a preset plane according to an embodiment of the present disclosure.
Figure 4B:
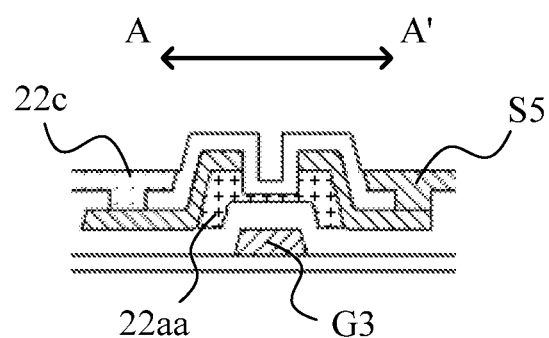
FIG. 4B is a sectional schematic structural diagram of A-A' of FIG. 4A.

FIG. 4A is a top-view structural schematic diagram of a three-dimensional display device near a preset plane according to an embodiment of the present disclosure. FIG. 4B is a sectional schematic structural diagram of A-A' of FIG. 4A. With reference to FIG. 4A and FIG. 4B, the above-described switching module 22a according to the embodiment of the present disclosure may be a thin film transistor (and may also be other electronically controlled switching element, such as an electric relay, a Hall switching element or other types of transistor in other embodiments), and a gate electrode of the thin film transistor and the scanning line (e.g., G2 and G3) are formed by a same conductive material layer, and a source-drain electrode and the sensing line (e.g., S3, S4 and S5) are formed by a same conductive material layer. Meanwhile, the thin film transistor includes an active layer 22aa, both sides of the active layer 22aa are respectively connected with a source electrode metal layer and a drain electrode metal layer, and its forming region corresponds to a forming region of a gate electrode metal layer. In addition, the thin film transistor further includes some insulating medium layers as shown in FIG. 4B, and thus, a function of the above-described switching module 22a can be achieved.

On the other hand, since the above-described sensing electrode 21a is used for receiving the electron beam, in order to avoid the electron beam from being blocked by other metal layers, the three-dimensional display device should not comprise, between a surface of emitting light and the preset plane, a metal layer overlapping too much with the forming region of the sensing electrode 21a; and in order to avoid other metal layers from receiving the electron beam to generate an interference signal, a shielding electrode layer 31 may be disposed near the surface of emitting light, so that the shielding electrode layer 31 covers a display region except the forming region of the sensing electrode 21a of the three-dimensional display device.

Further, the three-dimensional display device may be provided with a light-transmissive region and a non-transmissive region; and in order to avoid arrangement of the scanning line, the sensing line and the switching module from affecting a pixel aperture ratio of the device, the scanning line, the sensing line and the switching module 22a may be all located within the above-described non-transmissive region. Meanwhile, the sensing electrode 21a may be made of a transparent conductive material, and is located within the above-described light-transmissive region.

On the basis of any one of the above-described three-dimensional display devices, the above-described device may further comprise an array substrate and a color filter substrate (CF substrate) disposed opposite to each other, and a liquid crystal layer located between the above-described array substrate and the above-described color filter substrate. On the basis of the structure of the three-dimensional display device, the above-described preset plane may be located on a side of the color filter substrate away from the above-described liquid crystal layer, so that the electron beam may be directly blocked by the sensing electrode or be blocked by the common electrode layer on the color filter substrate, which will not affect a normal display function.

Based on a same inventive concept, an embodiment of the present disclosure provides a three-dimensional touch sensing method, comprising: emitting an electron beam having a preset emission intensity to a preset plane at a preset position located in a thickness direction of the three-dimensional display device, so that the above-described three-dimensional display device is configured to:

Receive an electron beam being perpendicularly incident to the above-described preset plane;

Obtain a reception position and a reception intensity of the above-described electron beam;

Determine a projection position of an emission position of the above-described electron beam on the above-described preset plane according to the reception position of the above-described electron beam;

Calculate a distance from the emission position of the above-described electron beam to the above-described preset plane by a preset electron beam intensity attenuation relationship, according to the reception intensity of the above-described electron beam and the above-described preset emission intensity.

It can be seen that, the method and the three-dimensional touch sensing method as shown in FIG. 1 correspond to each other in steps and processes, which will not be repeated here.

Based on a same inventive concept, an embodiment of the present disclosure further provides a wearable device, the device comprising an emitting unit, the above-described emitting unit being used for emitting an electron beam having a preset emission intensity to a preset plane at a preset position located in a thickness direction of a three-dimensional display device, so that the above-described three-dimensional display device is configured to:

Receive an electron beam being perpendicularly incident to the above-described preset plane;

Obtain a reception position and a reception intensity of the above-described electron beam;

Determine a projection position of an emission position of the above-described electron beam on the above-described preset plane according to the reception position of the above-described electron beam;

Calculate a distance from the emission position of the above-described electron beam to the above-described preset plane by a preset electron beam intensity attenuation relationship, according to the reception intensity of the above-described electron beam and the above-described preset emission intensity.

In an embodiment of the present disclosure, the above-described wearable device may have a shape of gloves, finger cots, or a ring and the like, and may emit the electron beam having the preset emission intensity, its emission direction may be designed to be the same as a direction pointed by a finger, so that an user equipped with the wearable device may make the electron beam having the preset emission intensity emitted in the direction pointed by the finger. It can be seen that, the wearable device and the above-described three-dimensional touch sensing method correspond to each other in steps, which will not be repeated here.

Figure 5:
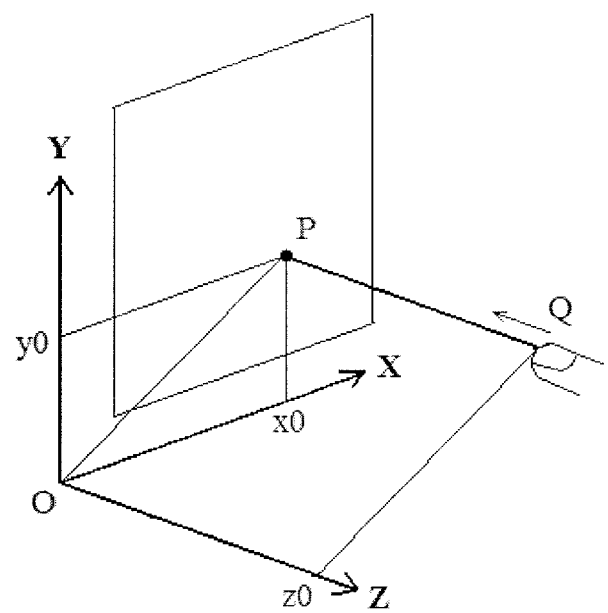
FIG. 5 is a principle diagram of three-dimensional touch sensing according to an embodiment of the present disclosure.

In summary, FIG. 5 is a principle diagram of three-dimensional touch sensing according to an embodiment of the present disclosure. With reference to FIG. 5, in a three-dimensional coordinate system XYZ with an origin as O, the preset plane is located in an X—O—Y plane, and the above-described three-dimensional display device may make a three-dimensional image displayed within a region in a positive direction of a Z-axis. According to a prompt of the three-dimensional image, the user may make a corresponding touch, for example, the user touches a Q point with coordinates (x0, y0, z0) in a three-dimensional space, and at this time, a wearable device worn on the user's finger (not shown in detail) may emit an electron beam whose transmission direction is perpendicular to the preset plane at the Q point with coordinates (x0, y0, z0). A position where the electron beam arrives at the preset plane is a P point with coordinates (x0, y0, 0), so that the receiving unit corresponding to the P point in the three-dimensional display device may receive the electron beam. Thus, the above-described three-dimensional display device may obtain the identifier of the receiving unit corresponding to the position of the P point, to determine a projection position of the touch position of the user on the preset plane, i.e., values of x0 and y0. Further, the above-described three-dimensional display device may, according to a reception intensity of the electron beam, in combination with the preset emission intensity of the electron beam emitted by the wearable device, calculate a distance from the point P to the point Q, i.e., a value of z0. Thus, the embodiment of the present disclosure may implement sensing the touch action of the user in the three-dimensional space, so that touch operation without touching the screen with the finger becomes possible, which facilitates implementing a vivid and lifelike 3D effect, to enhance the user experience.

It should be explained in the description of the present disclosure that directional or positional relationships shown by terms such as "upper", "lower" are directional or positional relationships shown as in the drawings, which only means to facilitate description of the disclosure and simplify the description, but do not indicate or imply that the devices or components must have specific directions, or be constructed or operated in the specific directions, and are not limitative of the present disclosure. Unless expressly stipulated or defined, terms "mounted", "connected" and "linked" should be broadly understood, for example, they may be fixedly connected, detachably connected, or integrally connected; may be mechanically connected or electrically connected; or may be directly connected, indirectly connected by a medium, or internally communicated between two components. For those ordinarily skilled in the art, the specific meanings of the terms in the present disclosure can be understood according to specific conditions.

In the specification provided herein, a plenty of particular details are described. However, it can be understood that an embodiment of the present disclosure may be practiced without these particular details. In some embodiments, well known methods, structures and technologies are not illustrated in detail so as not to obscure the understanding of the specification.

Similarly, it should be understood that, in the above description of the exemplary embodiments of the present disclosure, different characteristics of the present disclosure sometimes are grouped into a single embodiment, figure or description thereto in order to simplify the disclosure and to be helpful in understanding one or more of different aspects of the disclosure. Whereas, the disclosed method should not be interpreted to reflecting the intention as following: the present disclosure to be protected claims features more than that recorded clearly in each of the claims. More exactly, the inventive aspect consists in less than all of the features of a single embodiment previously disclosed, as that has been reflected in following claims. Thus, the claims corresponding to specific implementations are definitely incorporated in their corresponding implementations, in which each claim acts by itself as a single embodiment of the present disclosure.

It should be noted that the above embodiment illustrate the present invention but are not intended to limit the present disclosure, and those skilled in the art may design alternative embodiments without departing from the scope of the appended claims. In claims, any reference signs placed in parentheses should not be construed as limiting the claims. The word "comprising" does not exclude the presence of elements or steps not listed in a claim. The word "a" or "an" preceding an element does not exclude the presence of a plurality of such elements. The present invention may be implemented by virtue of hardware including several different elements and by virtue of a properly-programmed computer. In the device claims enumerating several units, several of these units can be embodied by one and the same item of hardware. The usage of the words first, second and third, etc., does not indicate any ordering. These words are to be interpreted as names.

The embodiment of the invention being thus described, it will be obvious that the same may be varied in many ways. Such variations are not to be regarded as a departure from the spirit and scope of the invention, and all such modifications as would be obvious to those skilled in the art are intended to be included within the scope of the following claims.

The present application claims priority of Chinese Patent Application No. 201510355772.1 filed on Jun. 24, 2015, the disclosure of which is incorporated herein by reference in its entirety as part of the present application.

The invention claimed is:

1. A three-dimensional display device, comprising:
a preset plane, positioned at a preset position in a thickness direction;
a plurality of receiving units, the receiving units being used for receiving an electron beam being perpendicularly incident to the preset plane on the preset plane, the electron beam having a preset emission intensity;
an obtaining unit connected with the plurality of receiving units, the obtaining unit being used for sequentially exporting charge on each of the sensing electrodes within each frame, so as to obtain a total amount of charge received by each of the sensing electrodes within a previous frame, for obtaining an identifier of the receiving unit which receives the electron beam, and a reception intensity of the electron beam received by the receiving unit according to the total amount of charge received by each of the sensing electrodes obtained by the exporting module;
a determining unit connected with the obtaining unit, the determining unit being used for determining a reception position of the electron beam and a projection position of a touch position on the preset plane according to the identifier of the receiving unit obtained by the obtaining unit;
a calculating unit connected with the obtaining unit, the calculating unit being used for calculating a distance from the touch position to the preset plane, according to the reception intensity of the electron beam obtained by the obtaining unit and the preset emission intensity,
wherein the reception intensity of the electron beam is obtained by accumulating charges which are received by the receiving unit at the reception position of the electron beam and charges which are received by the receiving units at positions nearby the reception position of the electron beam,
wherein the plurality of receiving units include: a plurality of sensing electrodes located on the preset plane, and a common electrode layer having a preset distance from the preset plane; the plurality of receiving units correspond to the plurality of sensing electrodes in a one-to-one correspondence relationship;
the sensing electrode and the common electrode layer constitute two electrodes of a capacitor for receiving the electron beam emitted by the wearable device and being perpendicularly incident to the preset plane,
wherein a shielding electrode layer is provided near the emitting light surface of the three-dimensional display device, and the shielding electrode layer covers a display region except a forming region of the sensing electrode in the three-dimensional display device.

2. A three-dimensional touch sensing method by using the three-dimensional display device according to claim 1, comprising:
receiving an electron beam being perpendicularly incident to a preset plane on the preset plane, the electron beam having a preset emission intensity;
obtaining a reception position and a reception intensity of the electron beam;
determining a projection position of a touch position on the preset plane according to the reception position of the electron beam; and
calculating a distance from the touch position to the preset plane according to the reception intensity of the electron beam and the preset emission intensity,
wherein the reception intensity of the electron beam is obtained by accumulating charges which are received by a receiving unit at the reception position of the electron beam and charges which are received by a receiving unit at positions nearby the reception position of the electron beam,
wherein the obtaining a reception position and a reception intensity of the electron beam includes:
obtaining the reception position of the electron beam;
obtaining the reception intensity of the electron beam includes:
according to the reception position, accumulating charges which are received by a receiving unit at the reception position of the electron beam and charges which are received by a receiving unit at positions nearby the reception position of the electron beam, to obtain the reception intensity of the electrode beam.

3. The method according to claim 2, wherein the calculating a distance from the touch position to the preset plane according to the reception intensity of the electron beam and the preset emission intensity, includes:
calculating the distance from the touch position to the preset plane, according to a preset electron beam intensity attenuation relationship, the reception intensity of the electron beam and the preset emission intensity.

4. The method according to claim 2, wherein the preset electron beam intensity attenuation relationship is:

$$I = AI_0 e^{-md}$$

where, I is the reception intensity of the electron beam, A is an attenuation ratio of a non-air medium layer through which the electron beam passes to the electron beam, $I_0$ is the preset emission intensity, m is an attenuation coefficient corresponding to air, and d is a thickness of an air medium layer through which the electron beam passes.

5. The method according to claim 4, wherein the attenuation coefficient in the preset electron beam intensity attenuation relationship is obtained by an actual test performed in advance.

6. The method according to claim 2, further comprising: determining a spatial position of the touch position according to the projection position, and the distance from the touch position to the preset plane.

7. The method according to claim 2, wherein the electron beam is emitted by a wearable device at the touch position.

8. The device according to claim 1, wherein according to the reception intensity of the electron beam obtained by the obtaining unit, the preset emission intensity and a preset electron beam intensity attenuation relationship, the calculating unit calculates the distance from the touch position to the preset plane.

9. The device according to claim 1, wherein the electron beam is emitted by a wearable device at the touch position.

10. The device according to claim 1, wherein in an incident direction of the electron beam, the common electrode layer is away from a emitting light surface of the three-dimensional display device further than the preset plane.

11. The device according to claim 10, wherein the gate electrodes of all the thin film transistors in the plurality of switching modules and the plurality rows of scanning lines are formed by a same conductive material layer, and the source electrode and the drain electrode of all the thin film transistors in the plurality of switching modules and the plurality columns of sensing lines are formed by a same conductive material layer.

12. The device according to claim 1, further comprising: an array substrate and a color filter substrate disposed opposite to each other, and a liquid crystal layer located between the array substrate and the color filter substrate; the preset plane being located on a side of the color filter substrate away from the liquid crystal layer.

13. A three-dimensional touch sensing method, comprising:
emitting an electron beam having a preset emission intensity to a preset plane at a preset position located in a thickness direction of the three-dimensional display device according to claim 1, so that the three-dimensional display device is configured to:
receive the electron beam being perpendicularly incident to the preset plane;
obtain a reception position and a reception intensity of the electron beam;
determine a projection position of an emission position of the electron beam on the preset plane according to the reception position of the electron beam;
calculate a distance from the emission position of the electron beam to the preset plane by a preset electron beam intensity attenuation relationship, according to the reception intensity of the electron beam and the preset emission intensity.

* * * * *